United States Patent
Wehrend et al.

(10) Patent No.: US 6,353,745 B1
(45) Date of Patent: Mar. 5, 2002

(54) METHOD FOR PROVIDING PERFORMANCE FEATURES FOR MOBILE SUBSCRIBERS VIA A COMMUNICATIONS NETWORK

(75) Inventors: Klaus Wehrend, Eichenau; Klaus Hünlich, Neuching, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/348,969

(22) Filed: Jul. 7, 1999

(30) Foreign Application Priority Data

Jul. 7, 1998 (DE) ......................................... 198 30 333

(51) Int. Cl.[7] ............................................. H04Q 7/20
(52) U.S. Cl. .................... 455/466; 455/422; 455/432; 455/436; 455/414; 370/338; 370/466
(58) Field of Search ................................ 455/422, 432, 455/436, 466, 556, 557, 414; 370/338, 466, 467

(56) References Cited

U.S. PATENT DOCUMENTS

| | | | | |
|---|---|---|---|---|
| 5,351,235 A | * | 9/1994 | Lahtinen | 370/58.1 |
| 5,610,920 A | * | 3/1997 | Doll et al. | 370/389 |
| 5,719,918 A | * | 2/1998 | Serbetciouglu et al. | 379/58 |
| 5,978,672 A | * | 11/1999 | Hartmaier et al. | 455/413 |
| 6,085,099 A | * | 7/2000 | Ritter et al. | 455/466 |
| 6,125,281 A | * | 9/2000 | Wells et al. | 455/466 |

OTHER PUBLICATIONS

International Publication WO 96/22000 (Jonsson), dated Jul. 18, 1996.
"Mobilfunk und Intelligente Netze", Jacek Biala, Friedr. Vieweg & Sohn Verlagsgesellschaft mbH, Braunschweig/Wiesbaden, 1995, pp. 142–146.
"Das virtuelle Büro", Andreas Wild, Siemens telcomreport, Issue 4, 1997.

* cited by examiner

Primary Examiner—Daniel Hunter
Assistant Examiner—Lana Le
(74) Attorney, Agent, or Firm—Herbert L. Lerner; Laurence A. Greenberg; Werner H. Stemer

(57) ABSTRACT

When an external terminal is signed on to a communications system, a short message service link is set up between the external terminal and a teleworking computer connected to the communications system. Control information which is transferred from the external terminal via the short message service link is converted by the teleworking computer into signaling information that is usually available within the scope of a signaling protocol between internal terminals and the communications system. The converted short message control information is then transferred on to a control unit of the communications system.

13 Claims, 2 Drawing Sheets

METHOD FOR PROVIDING PERFORMANCE FEATURES FOR MOBILE SUBSCRIBERS VIA A COMMUNICATIONS NETWORK

BACKGROUND OF THE INVENTION

FIELD OF THE INVENTION

The invention lies in the telecommunications field. Specifically, the invention pertains to a method with which performance features are provided to mobile subscribers in a communications network.

Working conditions are becoming increasingly flexible in terms of time and location. The number of employees who do not carry out their professional tasks at a fixed workplace at a company office is rising continuously. The publication "Das virtuelle Büro" telcomreport, Issue 4, 1997, Siemens AG, Berlin and Munich described that for tasks to be carried out effectively outside the company building it is often necessary to have access to the communications performance features provided within the company's local communications network. These features should be available irrespective of the location of the employee. Such performance features include the availability of a conference call setup with a conference circuit or signaling of an inputting of a message, which are additional to the standard performance features provided in a, say, ISDN-oriented communications network.

In order to enable the performance features which are implemented by a communications system to be made available at an external terminal in the same way as at an internal terminal—as envisioned within the scope of the so-called "teleworking"—the commonly assigned earlier patent application Ser. No. 09/259,637 proposes that terminal-oriented signaling information, such as is usually transferred within the scope of a signaling protocol between the communications system and internal terminals which are connected to it, should be transferred between the communications system and the external terminal via a data link which is set up in addition to the user data link.

This requires two user data links to be made available at the external terminal in order to transfer the user data via a first user data link (for example a first ISDN-oriented B channel) and the terminal-oriented signaling information via a second user data link (for example a second ISDN-oriented B channel). Furthermore, it is necessary for the external terminal to be designed in such a way that the terminal-oriented signaling information which has been transferred can be evaluated.

In order to be able to make the performance features implemented by the communications system available at an external terminal, in particular a mobile terminal, our commonly assigned earlier patent application Ser. No. 09/259, 915 proposed, furthermore, to transfer terminal-oriented signaling information items to the communications system via a voice link from the external mobile terminal, and vice versa, in the form of DTMF signals (Dual Tone Multi Frequency) in accordance with the MFM dialing method (Multi-Frequency dialing Method). For the DTMF signals, each key of a terminal is assigned a characteristic signal which is transferred via the voice link when the keys are operated. The DTMF signals differ in frequency and signal duration from the data normally transferred via the voice link, with the result that the DTMF signals can be identified and evaluated in the communications system.

However, this presupposes that the communications subscriber assigned to the external terminal knows the key combinations necessary for activating the performance features, and these combinations are in part long and unusual. On the other hand, the activation of a performance feature by tapping an acoustic user interface made available at the terminal by the communications system requires an unnecessarily long time interval.

SUMMARY OF THE INVENTION

It is accordingly an object of the invention to provide a method with which it is possible to render performance features otherwise available at internal subscriber terminating lines in a communications system to an external terminal, which overcomes the above-mentioned disadvantages of the heretofore-known devices and methods of this general type and which is easier to use and simpler in its application.

With the foregoing and other objects in view there is provided, in accordance with the invention, a method of providing performance features of a communications system available at internal subscriber terminating lines in the communications system to an external terminal via a communications network, which comprises:

setting up a short message service link between an external terminal and a teleworking computer connected via a teleworking subscriber line module of a communications system by signing on the external terminal with the communications system;

transferring items of control information entered at the external terminal in short message format via the short message service link to the teleworking computer; and converting the short messages received by the teleworking computer into terminal-orientated signaling information items, as are usually available according to a signaling protocol between internal terminals and the communications system, and transferring the converted short message to a control unit of the communications system via the teleworking subscriber line module.

For the purpose of a better understanding of the mode of operation of the "short message service," a brief review of these principles appears in order:

A short message service SMS (Short Message Service) for mobile communications systems has become known heretofore from the book entitled "Mobilfunk und Intelligente Netze—Grundlagen und Realisierung mobiler Kommunikation" ["Mobile Telephony and Intelligent Networks—Principles and Implementation of Mobile Communication"], Friedr. Vieweg & Sohn Verlagsgesellschaft, Braunschweig/Wiesbaden, Germany, 1995 (cf. pp. 145–46). The conventional short message service SMS is used to realize bidirectional transfer of information between a so-called service center—frequently denoted in the literature by "SMS center"—and the mobile terminal assigned to the service center. Within the scope of the so-called PtP service (Point-to-Point service) information items up to a length of 160 characters can be transmitted between the service center and a mobile terminal. The information is transferred via the signaling channels available within the scope of a mobile link between the service center and the mobile terminal. It is thereby possible to transfer this information while simultaneously transferring voice data which are to be transferred between the service center and the mobile terminal within the scope of an already existing voice link.

A substantial advantage of the invention consists in that the requirements made of the external terminal consist only in supporting a short message service (SMS) by the external terminal.

In accordance with an added feature of the invention, the teleworking computer is connected to the communications system via a digital interface of a subscriber line module, and the the short message service link is routed via the subscriber line module.

In accordance with an additional feature of the invention, the teleworking computer is connected via a modem to an analog interface of a subscriber line module of the communications system, and the short message service link is routed via the subscriber line module.

In accordance with another feature of the invention, the teleworking computer is connected to the communications network via a digital interface, and to the short message service link is routed via the digital interface.

In accordance with a further feature of the invention, the short message service link is routed via a short message service unit connected to the communications network, and the short messages are transferred bidirectionally via a radio link between the short message service unit and the external terminal within a scope of the short message service link.

In accordance with again an added feature of the invention, the bidirectional transfer of the short messages is implemented via a radio link between the external terminal and the teleworking computer within the scope of the short message service link.

In accordance with again an additional feature of the invention, a sign-on authorization is checked with the teleworking computer based on subscriber-related data transferred from the external terminal via the short message service link.

In accordance with again another feature of the invention, during sign-on, the teleworking computer assigns a first virtual subscriber connection port of the teleworking subscriber line module to the external terminal, and data routed by the control unit to an internal subscriber terminating line and identified by the subscriber-specific data, are rerouted to the virtual subscriber connection port.

In accordance with again a further feature of the invention, during a connection set-up between the external terminal and a further terminal brought about subsequently to sign-on of the external terminal, a terminal link between the external terminal and the further terminal is routed via the teleworking subscriber line module.

In accordance with yet an added feature of the invention, the items of control information to be transferred from the external terminal are transferred to the communications system when the terminal link exists between the external terminal and the communications system in the short message format via the short message service link.

In accordance with yet another feature of the invention, a plurality of terminal links are simultaneously routed in each case between one external terminal signed on to the communications system and one further terminal via the teleworking subscriber line module.

In accordance with a concomitant feature of the invention, the internal subscriber terminating line is set up merely as a virtual connection port.

A particular advantage of the above-mentioned refined features of the invention is that a subscriber who has signed on to the communications system at an external terminal can be accessed on the same call number, as at an internal terminal assigned to him.

By assigning virtual connection ports—often referred to as pseudo-connection ports in the literature—subscribers can utilize the performance features of the communications system at an external terminal even if they do not have a physically existing internal terminal assigned to them.

Other features which are considered as characteristic for the invention are set forth in the appended claims.

Although the invention is illustrated and described herein as embodied in a method for providing performance features for mobile subscribers via a communications network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
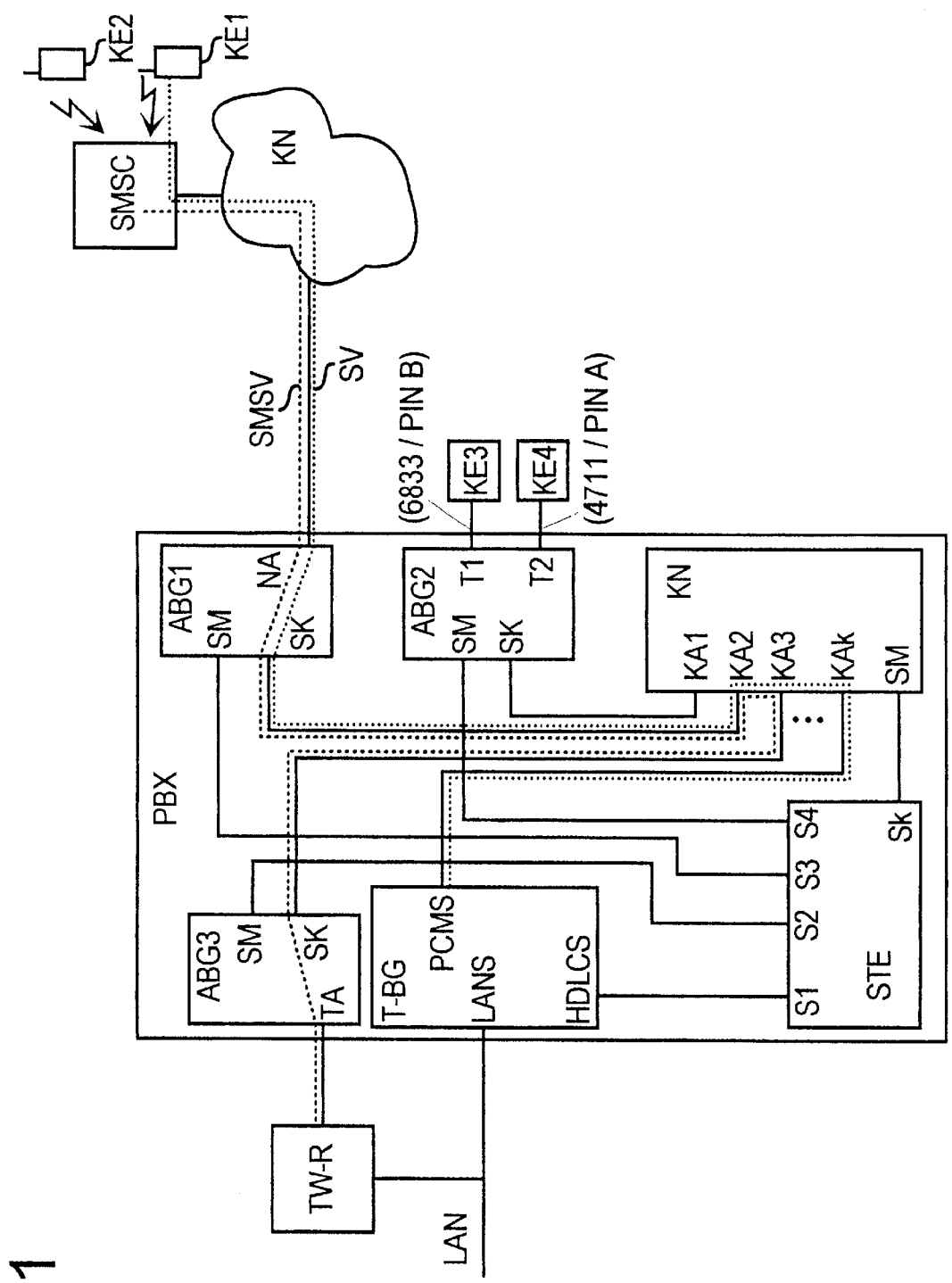
FIG. 1 is a schematic diagram representing the essential functional units which are involved in the teleworking concept.

Referring now to the figures of the drawing in detail and first, particularly, to FIG. 1 thereof, there is seen a schematic of a communications system PBX with a teleworking subscriber line module—referred to below as teleworking module T-BG—which is arranged in the system and is realized in the form of a subscriber terminating line. The communications system PBX has further subscriber terminating lines/network connection units for the connection of communications terminals. By way of example, a first, a second and a third connection unit ABG1, ABG2, ABG3 are represented. Furthermore, the communications system PBX contains a switching matrix unit KN which has a plurality of bi-directional, time-division-multiplex-oriented connection ports KA1, . . . ,Kak. The connection ports KA1, . . . ,KAk are implemented as PCM connections (Pulse Code Modulation), also referred to as PCM highways, speech highways or S2M connections. Each PCM highway comprises both 30 user channels, which are implemented as ISDN-oriented B channels (Integrated Services Digital Network) with a transmission rate of 64 kbit/s, and a signaling channel, which is implemented as an ISDN-oriented D channel with a transmission rate of 64 kbit/s. The switching matrix unit KN is connected via a connection port KAk to a bi-directional, time-division-multiplex-oriented PCM interface PCMS of the teleworking module T-BG. Via the further connection ports KA1, KA2, KA3 the switching matrix unit KN is connected to a bi-directional, time-division-multiplex-oriented connection SK of the first, the second and the third connection units ABG1, ABG2, ABG3, respectively.

Furthermore, a control unit STE having a plurality of control connections S1, . . . ,Sk is arranged in the communications system PBX. The control unit STE is connected to a control input SM of the switching matrix unit KN via a control connection Sk. Via the further control connections, S1, . . . ,S4, the control unit STE is connected both to an HDLC interface HDLCS, which is arranged at the teleworking module T-BG, and to control connections SM of the first, the second and the third connection unit ABG1, ABG2, ABG3.

A local computer network LAN is connected to the communications system PBX via a LAN interface LANS of the teleworking module T-BG. A computer, for example a personal computer—referred to below as teleworking computer TW-R—which is used to control the teleworking module T-BG—is arranged in the local computer network LAN.

The communications system PBX is connected to a communications network KN via a network connection NA of the first connection unit ABG1. The communications network KN can, for example, be an ISDN-oriented communications network or an analog communications network. Connected to the communications network KN is an SMS short message service unit—denoted below as service center SMSC—which is assigned to a mobile communications network and controls transfer from SMS short messages to terminals assigned to the mobile communications network. The mobile communications network is assigned a first external mobile terminal KE1 and a second external mobile terminal KE2.

A first internal terminal KE3 with a communications-system-internal call number 6833 is connected to a first subscriber terminating line T1—for example an S0 connection (2B+D, i.e. 2 ISDN-oriented user data channels and one ISDN oriented signaling channel)—of the second connection unit ABG2, and a second internal terminal KE4 with a communications-system-internal call number 4711 is connected to a second subscriber terminating line T2 of the second connection unit ABG2.

Furthermore, the communications system PBX is connected to the teleworking computer TW-R via a subscriber terminating line TA of the third connection unit ABG3. The connection of the teleworking computer TW-R to the communications system PBX can be performed, for example, via an S0 interface of the subscriber terminating line TA of the third connection unit ABG3. This proves to be advantageous, in particular, when the communications network KN is an ISDN-oriented communications network. The teleworking computer TW-R can alternatively be connected directly to the communications network KN—an ISDN-oriented communications network—via an S0 interface integrated in the teleworking computer TW-R. This presupposes that the teleworking computer TW-R is assigned a dedicated call number in the communications network KN.

If the communications network KN is an analog communications network, a connection of the teleworking computer TW-R to the communications system PBX can alternatively be performed via an analog a/b interface of the subscriber terminating line TA of the third connection unit ABG3 with the aid of a modem. In this case, the modem is connected to the teleworking computer TW-R via a V.24 interface, for example.

Figure 2:
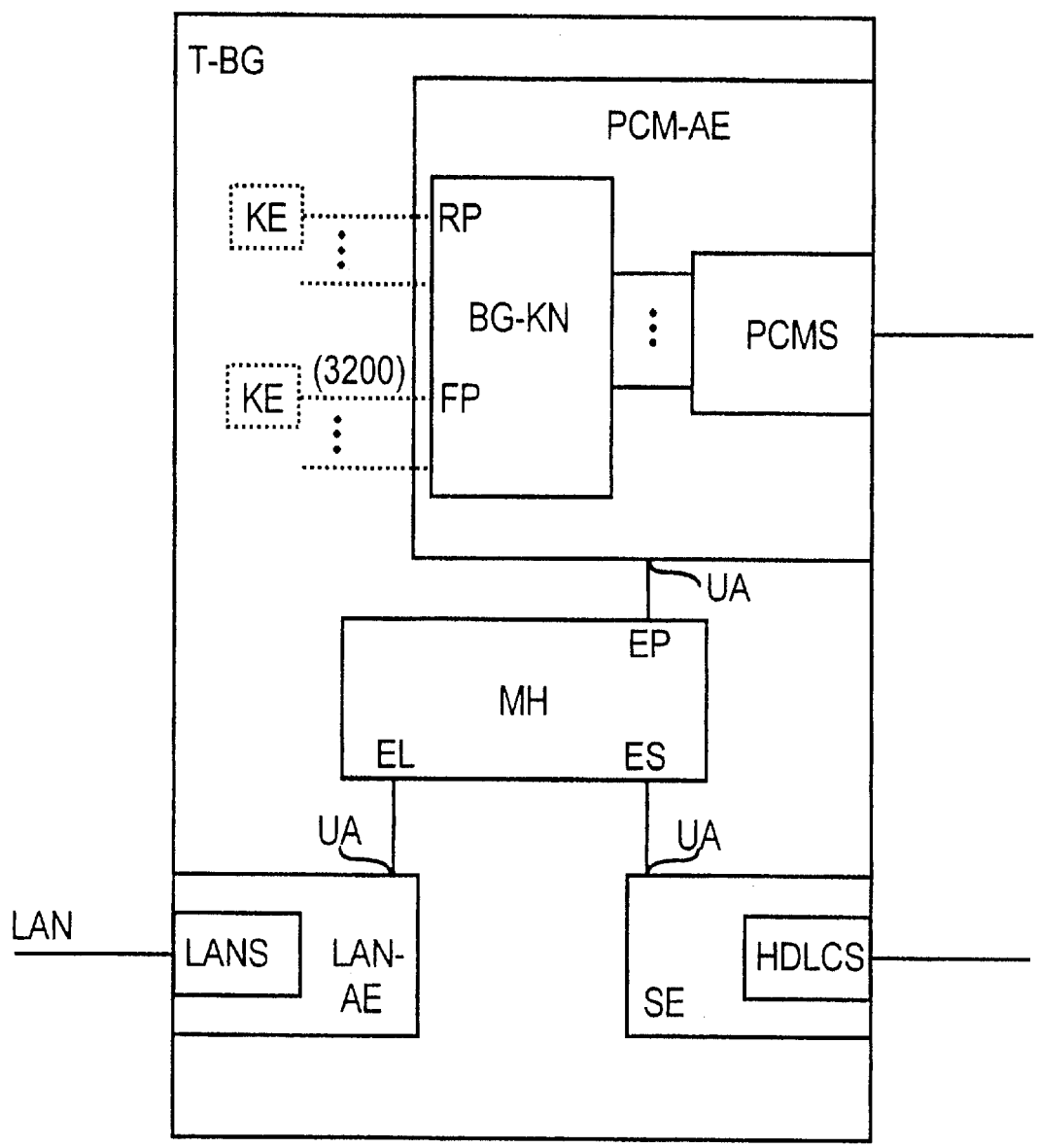
FIG. 2 is a schematic diagram representing the essential functional units of a teleworking subscriber line module of a communications system.

FIG. 2 shows a schematic representation of the essential functional units of the teleworking module T-BG. The teleworking module T-BG has a LAN connection unit LAN-AE with a LAN interface LANS, it being possible to connect the LAN interface LANS to the local computer network LAN. The teleworking module T-BG also has a PCM connection unit PCM-AE with a bi-directional, time-division-multiplex-oriented PCM interface PCMS, it being possible to connect the PCM interface PCMS to the connection port KAk of the switching matrix unit KN of the communications system PBX. Furthermore, the PCM connection unit PCM-AE has a module switching matrix unit BG-KN, which is connected to the PCM interface PCMS.

Furthermore, a signaling unit SE, with an HDLC interface HDLCS, is arranged on the teleworking module T-BG. The signaling unit SE can be connected to the control port S1 of the control unit STE of the communications system PBX via the HDLC interface HDLCS. The LAN connection unit LAN-AE, the PCM connection unit PCM-AE and the signaling unit SE are each connected via a port UA to a port EL, EP, ES of a conversion unit MH which is arranged on the teleworking module T-BG.

In the conversion unit MH it is decided, by reference to address information—i.e. destination and origin data—which are contained in data which are received via the PCM connection unit PCM-AE, the LAN connection unit LAN-AE or the control unit SE, whether the received data are intended to be transferred on or are intended to control the teleworking module T-BG. If the data are to be transferred on, they are converted in accordance with the protocol and transferred to the destination address.

Data packets are transferred between the LAN connection unit LAN-AE and the teleworking computer TW-R on the basis of the TCP/IP protocol (Transmission Control Protocol/Internet Protocol) for example. Data packets are transferred between the control unit STE of the communications system PBX and the signaling unit SE on the basis of the HDLC protocol (High Level Data Link Control).

In order to sign on the first external mobile terminal KE1 to the communications system PBX, a "teleworking" call number is entered into the first external mobile terminal KE1 by a subscriber, for example. Subsequently, a voice link SV is set up between the first external mobile terminal KE1 and the teleworking module T-BG.

To identify the first external mobile terminal KE1 at the communications system PBX, an SMS link SMSV is set up from the teleworking computer TW-R via the third connection unit ABG3, the switching matrix unit KN and the first connection unit ABG1 for the service center SMSC. Subsequently, an SMS message stored in the teleworking computer TW-R is transferred to the service center SMSC via the SMS link SMSV, which message is transferred on to the first external mobile terminal KE1 and output at a display of the first external mobile terminal KE1. This SMS message prompts the subscriber to enter the call number assigned to the first external mobile terminal KE1 in the communications network KN—denoted below as manual identification. Additionally, to authenticate the subscriber, the teleworking computer TW-R transfers a second stored SMS message via the SMS link SMSC to the first external mobile terminal KE1, which prompts the subscriber to enter a personal code number PIN (Personal Identification Number).

These identification and authentication data transferred in the form of SMS messages via the SMS link SMSV are transferred to the teleworking computer TW-R. The teleworking computer TW-R records as identified the first external mobile terminal KE1, for example by entering the first external mobile terminal KE1 in an identification list (not represented) if this has not already been done at an earlier identification.

By means of the code number PIN, transferred in the authentication data, it is determined via which internal subscriber connection port of the communications system PBX the subscriber would like to sign on to the communications system PBX, by reference to an assignment list (not represented) which is stored in the teleworking computer TW-R. If, for example, the code number PIN A is transferred within the scope of the authentication, the first external mobile terminal KE2 is signed on for the second internal terminal KE4. In addition, or as an alternative to transferring the code number PIN, the subscriber can be prompted to provide a personal password.

If the call number which has been assigned to the first external mobile terminal KE1 in the communications network KN has been automatically transferred (for example within the scope of a "calling party number" performance feature), from the first external mobile terminal KE1 to the teleworking computer TW-R—referred to as automatic identification in the following—, it is tested in the teleworking computer TW-R whether the first external mobile terminal KE1 has already been identified, i.e. whether the first external mobile terminal KE1 is already stored in the identification list. If the first external mobile terminal KE1 has not yet been identified, the teleworking computer transfers to the first external mobile terminal KE1 the second SMS message via the SMS link SMSV, which requests the subscriber to enter the personal code number PIN and/or the personal password.

The code number PIN which is provided by the subscriber can alternatively be assigned to a virtual connection port of the communications system PBX. As a result, subscribers who do not have any physically existing internal terminal assigned to them can also utilize the performance features of the communications system PBX at the external terminal.

The signing on of the first external mobile terminal KE1 is checked by reference to an authorization list (not illustrated) which is stored in the teleworking computer TW-R and which contains the communications-system-internal call numbers and/or code numbers PIN which are authorized for the "teleworking". If the check confirms the signing on, a virtual connection port—for example the virtual connection port FP with the communications-system-internal call number 3200—of the teleworking module T-BG is assigned to the first external mobile terminal KE1 by the teleworking computer TW-R. At the same time, the activation of the "call rerouting" performance feature which is implemented by the communications system PBX causes all the calls which are routed to the internal subscriber connection port (for example the second subscriber terminating line T2 of the second connection unit ABG2 with the communications-system-internal call number 4711), which is designated by the communications-system-internal call number and/or by the code number PIN, to be rerouted to the virtual connection port FP of the teleworking module T-BG.

If the voice link SV is interrupted (this corresponds to the normal case) after the sign-on, for example as a result of the receiver at the first external mobile terminal KE1 being hung up, renewed identification (transfer of the call number assigned to the first external mobile terminal KE1 in the communications system KN), of the first external mobile terminal KE1 to the communications system PBX is necessary. In addition to the identification data, the authentication data have to be transferred within the scope of a manual identification. The identification is performed automatically within the scope of an automatic identification.

In addition, provided that the first external mobile terminal KE1 has been signed on to the communications system PBX with the communications-system-internal call number or the code number of the second internal terminal KE4, terminal-oriented signaling information which is to be transferred from the control unit STE of the communications system PBX to the second internal terminal KE4 is rerouted to the virtual connection port FP of the teleworking module T-BG. The terminal-oriented signaling information is transferred from the control unit STE of the communications system PBX to the teleworking computer TW-R via the teleworking module T-BG.

A message (for example message stored in the voice mail box of the subscriber), which is transmitted from the control unit STE of the communications system PBX to the virtual connection port FP is evaluated in the teleworking computer TW-R and, in cases in which this message is to be transferred on to the first external mobile terminal KE1, it is converted into an SMS message which corresponds to the item of terminal-oriented signaling information. The SMS message is subsequently transferred via a newly set up SMS link SMSV to the service center SMSC, which transfers the SMS message on to the first external mobile terminal KE1. If the first external mobile terminal KE1 is not active, the SMS message is buffered in the service center SMSC until a transfer to the first external mobile terminal KE1 is possible.

If a link set-up to the second internal terminal KE4 is initiated from a further terminal (external or internal) provided that the first external mobile terminal KE1 is signed on to the communications system PBX with the communications-system-internal call number or code number of the second internal terminal KE4, a partial link is set up between the further terminal and the virtual connection port FP of the teleworking module T-BG by virtue of the activated call rerouting feature. In a further step, a further partial link is set up between a further virtual connection port RP of the teleworking module T-BG and the first external mobile terminal KE1 by reference to the call number of the first external mobile terminal KE1 in the communications network KN, said call number being transferred in the identification data. In a final step, the partial link and the further partial link are connected in the module switching matrix unit BG-KN of the teleworking module T-BG, giving rise to a terminal link between the first external mobile terminal KE1 and the further terminal.

In the case of a link set-up to a further (internal or external) terminal brought about by the first external mobile terminal KE1, renewed entry of the "teleworking" call number sets up a voice link SV to the further virtual connection port RP of the teleworking module T-BG. After the identification data, and additionally the authentication data, have been transferred via the SMS link SMSV, the teleworking computer TW-R transfers to the first external mobile terminal KE1 via the SMS link SMSV a stored SMS message which informs the subscriber of possible actions, for example outputting of a voice message which has been stored for the subscriber in the communications system PBX or setting up of a terminal link from the first external mobile terminal KE1 to a further terminal.

The inputting of a significant key combination at the first external mobile terminal KE1 causes an SMS message which corresponds to the key combination to be transferred via the SMS link SMSV to the teleworking computer TW-R which signals to the communications system PBX that a terminal link to a further terminal (internal or external) is to be set up from the virtual connection port FP of the teleworking module T-BG. Subsequently, the control unit STE of the communications system PBX sets up a partial link between the virtual connection port FP of the teleworking module T-BG and the switching matrix unit KN of the communications system PBX by seizing a free user channel of the PCM highway which connects the switching matrix unit KN and the teleworking module T-BG.

After the voice link SV has been connected to the partial link in the module switching matrix unit BG-KN of the teleworking module T-BG, the dial tone is issued at the first external mobile terminal KE1. The dialing information—for example 6833 for the first internal terminal KE3—which is then entered at the first external mobile terminal KE1 is transferred to the control unit STE of the communications system PBX. Subsequently, a terminal link is set up between the first external mobile terminal KE1 and the first internal terminal KE3 by the control unit STE of the communications system PBX.

If there is the possibility, at the first external mobile terminal KE1, of automatically transferring to the teleworking module T-BG (for example within the scope of a "calling party number" performance feature) the call number which has been assigned to the first external mobile terminal KE1 in the communications network KN, the subscriber can initialize a link set-up to the further external or internal terminal from the communications system PBX by entering a specific "teleworking" call number. The teleworking computer TW-R detects by reference to the specific "teleworking" call number that terminal link should be set up from the first external mobile terminal KE1 to a further external or internal terminal and does not accept the call of the first external mobile terminal KE1. In a subsequent step, a link is set up starting from the further virtual connection port RP of the teleworking module T-BG to the first external mobile terminal KE1, initiated by the communications system PBX, by reference to the call number of the first external mobile terminal KE1 in the communications network KN which has been automatically transferred, so that the subscriber at the first external mobile terminal KE1 does not incur any fees for the terminal link which is to be set up to the further external or internal terminal.

The items of control information which are transmitted by the first external mobile terminal KE1 during a terminal link between the first external mobile terminal KE1 and a further external or internal terminal are transferred in the form of SMS messages via the SMS link SMSV to the teleworking computer TW-R. The items of control information are identified by the teleworking computer TW-R and are converted, for example by reference to a conversion list (not illustrated) into terminal-oriented signaling information items. These converted terminal-oriented signaling information items are transferred to the control unit STE of the communications system PBX via the teleworking module T-BG.

After the terminal link between the first external mobile terminal KE1 and the further external or internal terminal has been cleared, the further virtual connection port RP of the teleworking module T-BG is released by the teleworking computer TW-R and is therefore available for a new link set-up between any terminal signed on to the communications system PBX and a further terminal. The virtual connection port FP of the teleworking module T-BG remains, in contrast, assigned to the first external mobile terminal KE1 and is not released until after the subscriber has caused the first external mobile terminal KE1 to be signed off at the communications system PBX. After the signing off, the terminal-oriented signaling information items which are to be transferred from the control unit STE of the communications system PBX to the subscriber are transferred, owing to the deactivation of the call rerouting feature at the communications system PBX, to the connection port of the internal terminal which is assigned to the subscriber—for example to the connection port of the second internal terminal KE4 with the communications-system-internal call number 4711. In the case of signing on of a further external terminal with the same communications-system-internal call number or code number as the first external mobile terminal KE1, the virtual connection port FP of the teleworking module T-BG is assigned to the further external terminal.

At most 256 virtual connection ports can be configured on the teleworking module T-BG. Furthermore, the teleworking module T-BG is connected in the form of PCM highways via 128 user data channels to the switching matrix unit KN of the communications system PBX. Since two user channels are required for each terminal link of a signed-on terminal to a further terminal, at most 64 terminal links can be set up simultaneously via the teleworking module T-BG. Since in the case of at most 64 simultaneously set-up terminal links, 64 further virtual connection ports RP of the teleworking module T-BG are seized by the terminal links, 191 free virtual connection ports FP of the teleworking module T-BG are available for signing on terminals at the communications system PBX.

We claim:

1. A method of providing performance features of a communications system available at internal subscriber terminating lines in the communications system, to an external terminal via a communications network, which comprises:

setting up a short message service link between an external terminal and a teleworking computer connected via a teleworking subscriber line module of a communications system by signing on the external terminal with the communications system;

transferring items of control information entered at the external terminal in short message format via the short message service link to the teleworking computer; and converting the short messages received by the teleworking computer into terminal-orientated signaling information items, as are usually available according to a signaling protocol between internal terminals and the communications system, and transferring the converted short message to a control unit of the communications system via the teleworking subscriber line module.

2. The method according to claim 1, wherein the teleworking computer is connected to the communications system via a digital interface of a subscriber line module, and the method further comprises routing the short message service link via the subscriber line module.

3. The method according to claim 1, wherein the teleworking computer is connected via a modem to an analog interface of a subscriber line module of the communications system, and the method further comprises routing the short message service link via the subscriber line module.

4. The method according to claim 1, wherein the teleworking computer is connected to the communications network via a digital interface, and the method further comprises routing the short message service link via the digital interface.

5. The method according to claim 1, which comprises routing the short message service link via a short message service unit connected to the communications network, and transferring the short messages bidirectionally via a radio link between the short message service unit and the external terminal within a scope of the short message service link.

6. The method according to claim 1, which comprises realizing a bidirectional transfer of the short messages via a radio link between the external terminal and the teleworking computer within a scope of the short message service link.

7. The method according to claim 1, which comprises checking a sign-on authorization with the teleworking computer based on subscriber-related data transferred from the external terminal via the short message service link.

8. The method according to claim 7, which comprises, during sign-on, assigning with the teleworking computer a first virtual subscriber connection port of the teleworking subscriber line module to the external terminal, and rerouting data routed by the control unit to an internal subscriber terminating line and identified by the subscriber-specific data, to the virtual subscriber connection port.

9. The method according to claim 1, which comprises, during a connection set-up between the external terminal and a further terminal brought about subsequently to sign-on of the external terminal, routing a terminal link between the external terminal and the further terminal via the teleworking subscriber line module.

10. The method according to claim 9, which comprises transferring the items of control information to be transferred from the external terminal to the communications system when the terminal link exists between the external terminal and the communications system in the short message format via the short message service link.

11. The method according to claim 10, which comprises simultaneously routing a plurality of terminal links in each case between one external terminal signed on to the communications system and one further terminal via the teleworking subscriber line module.

12. The method according to claim 9, which comprises simultaneously routing a plurality of terminal links in each case between one external terminal signed on to the communications system and one further terminal via the teleworking subscriber line module.

13. The method according to claim 1, wherein the internal subscriber terminating line is set up merely as a virtual connection port.

* * * * *